(12) United States Patent
Redondo et al.

(10) Patent No.: US 6,552,112 B1
(45) Date of Patent: Apr. 22, 2003

(54) CABLE WITH SELF-EXTINGUISHING PROPERTIES AND FLAME-RETARDANT COMPOSITION

(75) Inventors: Eduardo Grizante Redondo, Sao Paulo (BR); Franco Peruzzotti, Legnano (IT); Diego Tirelli, Sesto San Giovanni (IT); Antonio Zaopo, Milan (IT); Enrico Albizzati, Lesa (IT); Luca Castellani, Corsico (IT)

(73) Assignee: Pirelli Cavi e Sistemi S.p.A. (IT)

( * ) Notice: Subject to any disclaimer, the term of this patent is extended or adjusted under 35 U.S.C. 154(b) by 0 days.

(21) Appl. No.: 09/488,854

(22) Filed: Jan. 21, 2000

Related U.S. Application Data (63) Continuation of application No. PCT/EP98/04295, filed on Jul. 10, 1998.
(60) Provisional application No. 60/067,163, filed on Dec. 4, 1997.

(30) Foreign Application Priority Data

Jul. 23, 1997 (IT) ........................................ MI97A1739
Jul. 23, 1997 (IT) ........................................ MI97A1741
Dec. 1, 1997 (EP) ............................................ 97121042

(51) Int. Cl.[7] .......................... C08K 3/20; H01B 7/295
(52) U.S. Cl. ............................... 524/436; 174/110 SR
(58) Field of Search ......................... 524/436; 174/110, 174/110 SR (56) References Cited

U.S. PATENT DOCUMENTS

| | | |
|---|---|---|
| 4,098,762 A | 7/1978 | Miyata et al. |
| 4,145,404 A | 3/1979 | Miyata et al. |
| 4,317,765 A | 3/1982 | Gaylord |
| 4,348,459 A | 9/1982 | Drzal et al. |
| RE31,518 E | 2/1984 | Fischer |
| 4,948,669 A | 8/1990 | Rolland |
| 4,948,840 A | 8/1990 | Berta |
| 4,985,502 A | 1/1991 | Izumi et al. |
| 5,008,204 A | 4/1991 | Stehling |
| 5,229,478 A | 7/1993 | Floyd et al. |
| 5,246,783 A * | 9/1993 | Spenadel et al. ........... 428/461 |
| 5,272,236 A | 12/1993 | Lai et al. |
| 5,414,040 A | 5/1995 | McKay et al. |
| 5,525,757 A | 6/1996 | O'Brien |
| 5,777,018 A * | 7/1998 | Imahashi ..................... 524/400 |
| 5,861,463 A * | 1/1999 | Sehanobish et al. ........ 525/240 |

FOREIGN PATENT DOCUMENTS

| | | |
|---|---|---|
| EP | 0 328 051 A1 | 8/1989 |
| EP | 0 416 815 | 3/1991 |
| EP | 0 418 044 | 3/1991 |
| EP | 0 530 940 | 3/1993 |
| EP | 0 542 253 | 5/1993 |
| EP | 0 618 259 | 10/1994 |
| EP | 0 632 065 | 1/1995 |
| EP | 0 780 425 | 6/1997 |
| EP | 1016689 | 7/2000 |
| JP | 63 225 641 | 9/1988 |
| JP | 63-225641 | 9/1988 |
| JP | 1-294792 | 11/1989 |
| JP | 3-231944 | 10/1991 |
| JP | 5-17692 | 1/1993 |
| JP | 7-161230 | 6/1995 |
| WO | WO 93/19107 | 9/1993 |
| WO | WO 94/06859 | 3/1994 |
| WO | WO 96/23311 | 8/1996 |
| WO | WO 96/27885 | 9/1996 |

OTHER PUBLICATIONS

U.S. patent application Ser. No. 10/095,321, Castellani et al., filed Mar. 2002.

V.K. Gupta et al., "Metallocene Complexes of Group 4 Elements in the Polymerization of Monoolefins," Journal of Macromolecular Science: Reviews in Macromolecular Chemistry and Physics, vol. C34, No. 3, pp. 439–514 (1994).

AN 98–205243, "Low–Smoke, Self–Extinguishing Electric Cable Coating Composition —Comprises a Crystalline Propylene Polymer, A Copolymer of Ethylene with an Alpha––Olefin and Optionally a Diene, and Natural Magnesium Hydroxide", Derwent Publications Ltd., London, GB, XP–002084928, (1998).

L. Wild et al., "Determination of Branching Distributions in Polyethylene and Ethylene Copolymers", Journal of Polymer Science: Polymer Physics Edition, vol. 20, pp. 441–455, (1982).

P.C. Möhring et al., "Homogeneous Group 4 Metallocene Ziegler–Natta Catalyste: The Influence of Cyclopentadienyl–Ring Substituents", Journal of Organometallic Chemstry, vol. 479, pp. 1–29, (1994).

* cited by examiner

Primary Examiner—Peter Szekely
(74) Attorney, Agent, or Firm—Finnegan, Henderson, Farabow, Garrett & Dunner, L.L.P.

(57) ABSTRACT

A flame-retardant composition includes a crystalline propylene homopolymer or copolymer, a copolymer of ethylene with at least one alpha-olefin having from 3 to 12 carbon atoms, and optionally with a diene, the copolymer of ethylene being characterized by a composition distribution index greater than 45%, the index being defined as a weight percentage of copolymer molecules having an alpha-olefin content within 50% of an average total molar content of alpha-olefin, and natural magnesium hydroxide in amounts such as to impart flame-retardant properties. A related cable with self-extinguishing properties includes a conductor and a flame-retardant coating. The flame-retardant coating includes the flame-retardant composition. A related method for manufacturing a cable having improved mechanical properties and enhanced fire resistance includes the steps of preparing a polymer mixture with flame-retardant properties and extruding the mixture on a conductor optionally pre-coated with an insulating layer, in order to obtain a flame-retardant coating.

68 Claims, 1 Drawing Sheet

FIG. 1

CABLE WITH SELF-EXTINGUISHING PROPERTIES AND FLAME-RETARDANT COMPOSITION

This application is a continuation of International Application No. PCT/EP98/04295, filed Jul. 10, 1998, in the European Patent Office; additionally, Applicants claim the right of priority under 35 U.S.C. §119(a)–(d) based on patent application No. MI97A 001739, filed Jul. 23, 1997, in Italy, patent application No. MI97A 001741, filed Jul. 23, 1997, in Italy, and patent application No. 97121042.2, filed Dec. 1, 1997, in the European Patent Office; further, Applicants claim the benefit under 35 U.S.C. §119(e) based on prior-filed, copending provisional application No. 60/067,163, filed Dec. 4, 1997, in the U.S. Patent and Trademark Office; the contents of all of which are relied upon and incorporated herein by reference.

BACKGROUND OF THE INVENTION

1. Field of the Invention

The present invention relates to cables, in particular for low-voltage electrical energy distribution or for telecommunications, these cables having low-smoke self-extinguishing properties, and to the flame-retardant compositions used therein.

2. Description of the Related Art

Self-eixtinguishing cables can be produced having a flame-retardant coating made from a polymer composition to which fire-resistant properties have been given by adding a suitable additive. Polyolefin-based compositions based, for example, on polyethylene or ethylene/vinyl acetate copolymers, containing an organic halide combined with antimony trioxide as flame-retardant additive can, for example, be used for this purpose. However, halogenated flame-retardant additives have many drawbacks since they partially decompose during processing of the polymer, giving rise to halogenated gases that are toxic to workers and corrode metal parts of the polymer-processing equipment. In addition, when they are placed directly in a flame, their combustion gives rise to large amounts of fumes containing toxic gases. Similar drawbacks are encountered when polyvinylchloride (PVC) supplemented with antimony trioxide is used as base polymer.

Therefore, in recent years the production of self-extinguishing cables has been directed toward halogen-free compositions, using as flame-retardant filler inorganic oxides, preferably in hydrate or hydroxide form, in particular magnesium hydroxide or aluminium hydroxide.

Aluminium hydroxide starts to decompose at a relatively low temperature (about 190° C.), which can result in various drawbacks during extrusion of the polymer composition, with formation of bubbles and defects in the final product. Therefore, the use of aluminium hydroxide as flame retardant is generally limited to polymer materials which do not require high processing temperatures. In contrast, magnesium. hydroxide has a decomposition temperature of about 340° C. and is characterized by greater heat stability and a high decomposition enthalpy. These properties make magnesium hydroxide particularly suitable as flame retardant filler in polymer compositions for coating cables, which require high extrusion temperatures and a small number of morphological defects.

However, the use of magnesium hydroxide as a flame-retardant filler does have certain drawbacks. Firstly, in order to obtain an efficient flame-retardant effect, very large amounts of magnesium hydroxide must be added to the polymer material, generally about 120–250 parts by weight relative to 100 parts by weight of polymer material. Such high levels of filler lead to a reduction in processability and in mechanical and elastic properties of the resulting mixture, in particular as regards impact resistance, elongation and stress at break.

In the U.S. Pat. No. 4,145,404 these drawbacks are attributed to the low affinity of natural magnesium hydroxide, obtained for example by grinding minerals such as brucite, with the polymer material, in particular when the polymer is of low polarity, as in the case of polyolefins.

In the patent EP-780,425 it is pointed out that the presence of different metal impurities, such as iron or manganese salts, in magnesium hydroxide of natural origin causes degradation of the polymer matrix into which the magnesium hydroxide is inserted.

Therefore, research efforts have been directed towards modifying properties of magnesium hydroxide to improve its compatibility with the polymer matrix and its degree of purity. Various synthetic methods have thus been developed in which magnesium hydroxide is produced by adding alkalis to an aqueous solution of a soluble salt thereof and subsequent precipitation. of the hydroxide by heating at high pressure (see for example patent U.S. Pat. No. 4,098,762 or the above-mentioned patents EP-780,425 and U.S. Pat. No. 4,145,404). In this way, a magnesium hydroxide is obtained with a high degree of purity and high structural uniformity with formation of crystallites of flattened hexagonal shape with an average diameter not greater than 2 μm and a specific surface area, measured by BET method, not greater than 20 m$^2$/g.

However, the use of synthetic magnesium hydroxide as flame-retardant filler has a considerable impact on the cost of the finished product, so as to make flame-retardant systems based on magnesium hydroxide non-competitive when compared with the halogen-containing flame-retardant compositions described above.

In certain cases attempts have been made to improve properties of natural magnesium hydroxide using suitable grinding and/or surface treatment processes.

For example, Japanese patent application JP-01-294792 (Kokai) describes a process for the production of magnesium hydroxide, in which natural brucite is wet-ground so as to obtain an average particle diameter of between 2 and 6 μm, and then surface-treated with a fatty acid ammonium salt, and eventually dried. The resulting magnesium hydroxide would be resistant to efflorescence phenomena caused by carbonation of magnesium hydroxide by atmospheric carbon dioxide. The process of wet-grinding is considered essential to make the particle size of the product more uniform without increasing its lattice distortion coefficient which is thought to be responsible for high resistance to carbonation of natural magnesium hydroxide. The surface treatment is thought to improve dispersibility of the filler in the polymer matrix. The magnesium hydroxide thus obtained is claimed to be useful as a flame-retardant for polyolefin resins. In particular, the examples describe compositions with flame-retardant properties based on ethylene/vinyl acetate (EVA) and ethylene/ethyl acrylate (EEA) copolymers.

Japanese patent application JP-03-231,944 (Kokai) describes polyolefin-based compositions having flame-retardant properties and containing magnesium hydroxide with an average particle diameter of between 3 and 13 μm and the following particle size distribution: 1–20% by weight of particles with a diameter less than or equal to 1

μm; 55–98% by weight of particles with a diameter between 1 and 15 μm; 1–25% by weight of particles with a diameter between 15 and 50 μm. This particle size distribution is believed to afford higher flame resistance, which would be accompanied by good mechanical strength, flexibility and processability. A magnesium hydroxide with these properties would be obtainable by suitable grinding of natural brucite, followed by sieving or addition of another material of predetermined particle size. According to the description given in the above-mentioned patent application, this type of magnesium hydroxide would be useful as a flame-retardant filler for polyolefins such as polyethylene, olefinic rubbers, polypropylene, polybutene and the like. Particular mention is made of ultra-low-density polyethylene (ULDPE) having a density of 0.860–0.910 g/cm$^3$, obtainable by copolymerization of ethylene with an alpha-olefin in the presence of a conventional Ziegler-Natta catalyst based on titanium and/or vanadium compounds.

Lastly, Japanese patent application JP-05-17692 (Kokai) describes polymer compositions having flame-retardant properties and containing natural magnesium hydroxide which has previously been ground and surface-treated with a fatty acid or a fatty acid salt, or alternatively with a silane or a titanate acting as coupling agent. These compositions would be characterized by high resistance to acid attacks. The subsequent Japanese patent application JP-07-161230 (Kokai) describes compositions similar to the above, pointing out that, in order to decrease the hygroscopicity of magnesium hydroxide, the latter must be surface-treated with the same products as mentioned above, in amounts of between 0.5 and 5% by weight relative to the magnesium hydroxide weight. In both of the above-mentioned Japanese patent applications, polyolefins such as polyethylene, ethylene/propylene rubbers, acrylic rubbers and the like are cited as polymeric materials, and flame-retardant compositions based on ethylene/ethylacrylate (EAA) polymers are given as particular examples. No information is provided regarding mechanical, elastic or processability properties of the resulting mixtures.

From the foregoing, it is clear that in the prior art considerable efforts have been made to improve the properties of flame-retardant polymer compositions containing magnesium hydroxide by modifying the properties of magnesium hydroxide itself, in terms of crystallinity, particle size distribution and/or surface properties. These modifications have been achieved either by developing synthetic processes starting from soluble magnesium salts or by appropriately modifying and treating natural magnesium hydroxide. For the purposes of the present invention, with enhanced flame-retardant properties it is meant that a cable passes a test as defined by standard CEI 332-1; with enhanced mechanical properties it is meant a high elongation at break value and a relatively low modulus, which are capable of determining a cable flexibility which is suitable for use; in particular, it is meant that mechanical properties are essentially not lower than those of cables using compositions of known type, for example halogenated compositions.

SUMMARY OF THE INVENTION

The Applicant has now found that it is possible to produce self-extinguishing, halogen-free cables producing a low level of fumes and having high flame resistance and excellent mechanical performances by using natural magnesium hydroxide as flame-retardant filler and, as polymer matrix, a polymeric mixture comprising a crystalline propylene homopolymer or copolymer and a copolymer of ethylene with an alpha-olefin, and optionally with a diene, characterized by uniform distribution of the alpha-olefin among the copolymer molecules.

Therefore, according to a first aspect, the present invention relates to a cable with self-extinguishing properties, comprising a conductor and a flame-retardant coating, characterized in that the said flame-retardant coating comprises:

(a) a crystalline propylene homopolymer or copolymer;
(b) a copolymer of ethylene with at least one alpha-olefin, and optionally with a diene, said copolymer (b) being characterized by a composition distribution index greater than 45%, said index being defined as the weight percentage of copolymer molecules having an alpha-olefin content within 50% of the average total molar content of alpha-olefin;
(c) natural magnesium hydroxide in an amount such as to impart flame-retardant properties.

In a second aspect, the present invention relates to a flame-retardant composition comprising:

(a) a crystalline propylene homopolymer or copolymer;
(b) a copolymer of ethylene with at least one alpha-olefin, and optionally with a diene, said copolymer (b) being characterized by a composition distribution index greater than 45%, said index being defined as the weight percentage of copolymer molecules having an alpha-olefin content within 50% of the average total molar content of alpha-olefin;
(c) natural magnesium hydroxide in an amount such as to impart flame-retardant properties.

The composition distribution index provides an indication of the distribution of the alpha-olefin among the copolymer molecules (the higher the value of this index, the more homogeneous the distribution of the comonomer among the copolymer molecules), and can be determined by Temperature Rising Elution Fractionation, as described, for example, in patent U.S. Pat. No. 5,008,204 or in Wild et al., J. Poly. Sci. Poly. Phys. Ed., Vol. 20, p. 441 (1982).

In the Applicant's view, the composition distribution index is related to the ability of the copolymers of ethylene with an alpha-olefin, and optionally with a diene, to incorporate and disperse large amounts of the flame-retardant filler, thereby obtaining a mixture having excellent flame-resistance and, at the same time, good processability and improved mechanical properties. Given a certain ratio between flame-retardant filler and polymer matrix, it is important to determine the minimum value of this index which is sufficient to obtain the desired combination of mechanical properties and processability.

Moreover, the presence in the polymer mixture of a crystalline propylene homopolymer or copolymer makes it possible to obtain a thermoplastic coating which has increased thermocompression resistance even at the maximum operating temperatures, so as to pass the thermocompression test described in CEI standard 20-34/3-1. This test consists in subjecting the coating of a cable specimen to a predetermined compression at a predetermined temperature and for a predetermined time. At the end of the test, the flattening degree of the coating, expressed as percentage of the residual thickness relative to the initial thickness of the coating, is measured: the sample passes the test if its residual thickness is greater than 50% of its initial thickness.

In a further aspect, the present invention relates to a method for obtaining a cable having improved mechanical properties and increased fire resistance, said method comprising the following steps: (1) preparing a polymer mixture having flame-retardant properties; (2) extruding said mixture on a conductor optionally pre-coated with an insulating layer, characterized in that step (1) comprises mixing a predetermined amount of natural magnesium hydroxide with a polymer mixture comprising:

(a) a crystalline propylene homopolymer or copolymer, as a polymeric component capable of increasing the thermocompression resistance of the flame-retardant coating; and:

(b) a copolymer of ethylene with at least one alpha-olefin, and optionally with a diene, capable of dispersing natural magnesium hydroxide, so as to improve processability of the mixture and enhance mechanical properties of the flame-retardant coating.

The amount of natural magnesium hydroxide to be added is predetermined so as to obtain a cable which is capable of passing the fire-resistance test according to CEI standard 332-1. The amount of propylene homopolymer or copolymer (a) is such that the flame-retardant coating obtained after extrusion has a value of thermocompression resistance, measured at 100° C. according to CEI standard 20-34/3-1, greater than 50%. The amount of copolymer (b) is such that the flame-retardant coating obtained after extrusion has an elongation at break, measured according to CEI standard 20-34 §5.1, of at least 100%, preferably of at least 150%, and a modulus at 20%, measured according to CEI standard 20-34 §5.1, of less than 12 MPa, preferably less than 7 MPa.

DETAILED DESCRIPTION OF THE PREFERRED EMBODIMENTS

The term "low voltage" is understood generally to refer to a voltage of less than 2 kV, preferably less than 1 kV.

Figure 1:
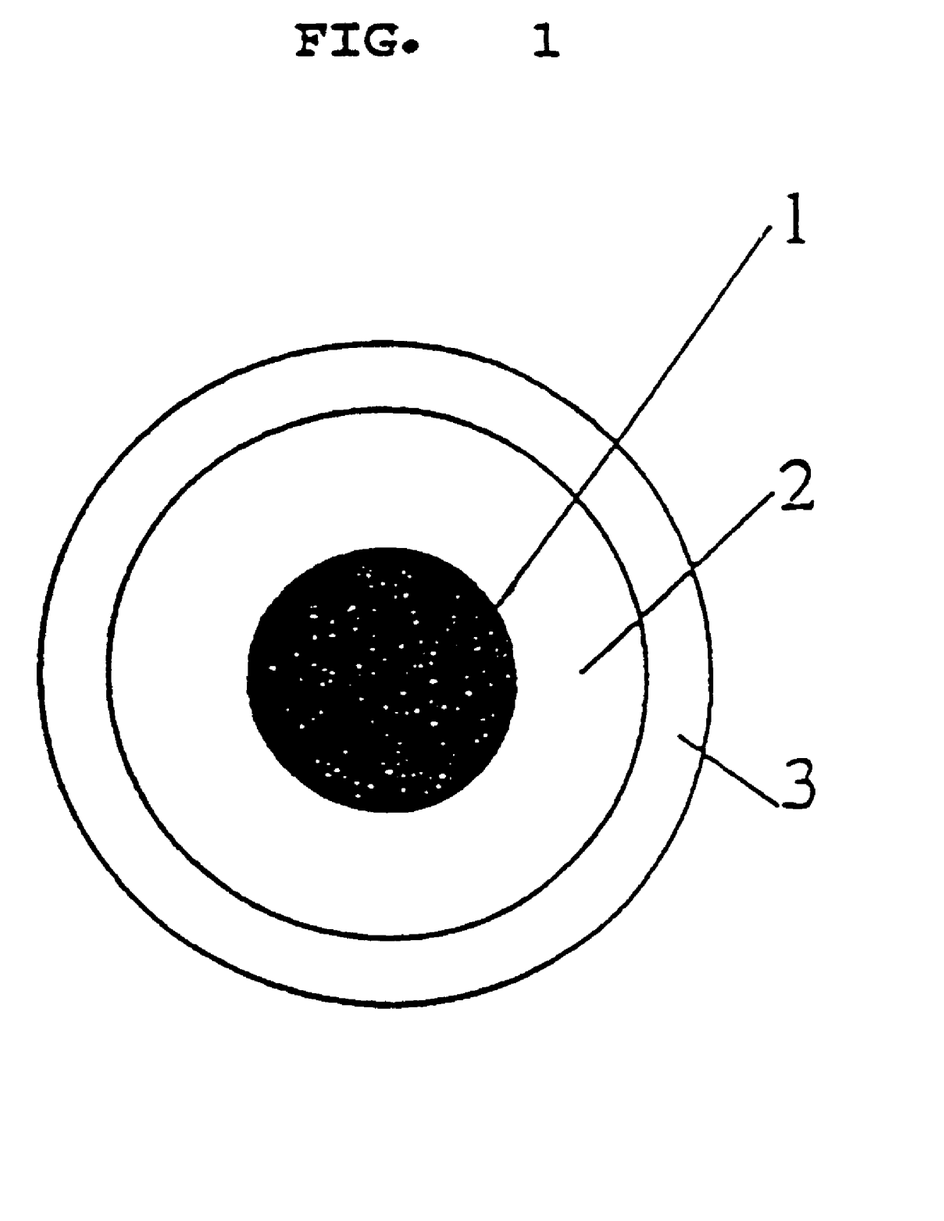
FIG. 1 shows, in a schematic form, the cross-section of a low-voltage electrical cable of unipolar type according to one embodiment of the present invention, this cable comprising a conductor (1), an inner layer (2) acting as electrical insulation and an, outer layer (3) acting as a protective sheath with flame-retardant properties, consisting of the composition according to the present invention.

The inner layer (2) may consist of a halogen-free, crosslinked or non-crosslinked polymer composition with electrically insulating properties which is known in the art, selected, e.g., from: polyolefins (homopolymers or copolymers of different olefins), olefin/ethylenically unsaturated ester copolymers, polyesters, polyethers, polyether/polyester copolymers, and mixtures thereof. Examples of such polymers are: polyethylene (PE), in particular linear low density PE (LLDPE); polypropylene (PP); propylene/ethylene thermoplastic copolymers; ethylene/propylene rubbers (EPR) or ethylene/propylene/diene rubbers (EPDM); natural rubbers; butyl rubbers; ethylene/vinylacetate (EVA) copolymers; ethylene/methylacrylate (EMA) copolymers; ethylene/ethylacrylate (EEA) copolymers; ethylene/butylacrylate (EBA) copolymers; ethylene/alpha-olefin copolymers, and the like. It is also possible to use the same polymer base for the inner layer (2) as well as for the outer layer (3), namely the mixture of (a) and (b) as defined above.

Alternatively, a self-extinguishing cable according to the present invention may consist of a conductor coated directly with the flame-retardant composition described above, without interposing other insulating layers. In this way, the flame-retardant coating also acts as electrical insulator. A thin polymer layer acting as an anti-abrasive can then be externally added, optionally supplemented with a suitable pigment to colour the cable for identification purposes.

According to the present invention, with the term natural magnesium hydroxide it is meant magnesium hydroxide obtained by grinding minerals based on magnesium hydroxide, such as brucite and the like. Brucite is found in its pure form or, more often, in combination with other minerals such as calcite, aragonite, talc or magnesite, often in stratified form between silicate deposits, for instance in serpentine asbestos, in chlorite or in schists.

For the purposes of the present invention, brucite can be ground according to known techniques, under wet or dry conditions, preferably in the presence of grinding coadjuvants, for example polyglycols or the like. The specific surface of the ground product is generally between 5 and 20 $m^2/g$, preferably between 6 and 15 $m^2/g$. The magnesium hydroxide thus obtained can then be classified, for example by sieving, to obtain an average particle diameter generally of between 1 and 15 $\mu$m, preferably between 1.5 and 5 $\mu$m, and a particle size distribution such that not more than 10% of the total number of particles have a diameter lower than 1.5 $\mu$m, and not more than 10% of the total number of particles have a diameter greater than 20 $\mu$m.

Natural magnesium hydroxide generally contains various impurities derived from salts, oxides and/or hydroxides of other metals such as Fe, Mn, Ca, Si, V, etc. Amount and nature of the impurities can vary depending on the source of the starting mineral. The degree of purity is generally between 80 and 98% by weight. As regards water-soluble ionic-type impurities, their content can be determined indirectly by measuring electrical conductivity of an aqueous extract obtained by placing magnesium hydroxide in contact with a suitable amount of water for a predetermined period of time at a predetermined temperature. A more detailed description of this measurement, based on ISO method 787, is given hereinbelow. According to this method, electrical conductivity of the aqueous extract obtained from natural magnesium hydroxide is generally between 100 and 500 $\mu$S/cm, preferably between 120 and 350 $\mu$S/cm.

The natural magnesium hydroxide according to the present invention can be used as such or in the form of particles whose surface has been treated with saturated or unsaturated fatty acids containing from 8 to 24 carbon atoms, or metal salts thereof, such as, for example: oleic acid, palmitic acid, stearic acid, isostearic acid, lauric acid; magnesium or zinc stearate or oleate; and the like. To increase compatibility with the polymer matrix, natural magnesium hydroxide can also be surface-treated with suitable coupling agents, for example organic silanes or titanates such as vinyltriethoxysilane, vinyltriacetylsilane, tetraisopropyltitanate, tetra-n-butyltitanate, and the like.

Using Scanning Electron Microscopy (SEM), it has been observed that natural magnesium hydroxide has a highly irregular granular morphology in terms both of its geometrical shape and of its surface appearance. In contrast, the magnesium hydroxide obtained by precipitation consists of flattened hexagonal crystallites that are substantially uniform both in size and morphology.

As regards the copolymers (b), they are generally characterized by a narrow molecular weight distribution, with an index of molecular weight distribution (MWD), defined as the ratio between the weight-average molecular weight $M_w$ and the number-average molecular weight $M_n$, of less than 5, preferably between 1.5 and 3.5. The molecular weight distribution index can be determined, according to conventional methods, by Gel Permeation Chromatography (GPC).

With alpha-olefin it is meant an. olefin of formula $CH_2=CH-R$, wherein R is a linear or branched alkyl having from 1 to 10 carbon atoms. The alpha-olefin can be selected, for example, from propylene, 1-butene, 1-pentene, 4-methyl-1-pentene, 1-hexene, 1-octene, 1-dodecene and the like. Propylene, 1-hexene and 1-octene are particularly preferred.

When the alpha-olefin is propylene, the copolymers (b) are also characterized by high regioregularity in the sequence of monomer units. In particular, these copolymers have a number of —$CH_2$— groups in —$(CH_2)_n$— sequences, where n is an even integer, relative to the total number of —$CH_2$— groups, generally lower than 5% by mole, preferably lower than 1% by mole. This quantity can be determined according to known techniques by means of $^{13}$C-NMR analysis.

When a diene comonomer is present, it generally has from 4 to 20 carbon atoms, and is preferably selected from: linear, conjugated or non-conjugated diolefins, for example 1,3-butadiene, 1,4-hexadiene or 1,6-octadiene; monocyclic or polycyclic dienes, for example 1,4-cyclohexadiene, 5-ethylidene-2-norbornene, 5-methylene-2-norbornene, and the like.

In general, for the purposes of the present invention, the desired mechanical and thermocompression resistance characteristics of the flame-retardant coating may be obtained using polymer mixtures comprising from 5 to 60% by weight, preferably from 10 to 40% by weight, of a crystalline propylene homopolymer or copolymer (a), and from 40 to 95% by weight, preferably from 60 and 90% by weight, of a copolymer (b), the percentages being referred to the total weight of the polymeric components (a) and (b).

Within the class of copolymers (b) as defined above, two main groups of products can be distinguished.

The first group (b1) consists of copolymers of ethylene with at least one $C_3$–$C_{12}$ alpha-olefin, and optionally a diene, these copolymers having elastomeric properties and preferably characterized by:

melting enthalpy lower than 35 J/g, preferably lower than 30 J/g;

intrinsic viscosity [η] generally greater than 1.0 dl/g, preferably greater than 2.0 dl/g (determined in tetralin at 135° C.);

Mooney viscosity MT(1+4) at 125° C. (measured according to Standard ASTM D1646) generally greater than 10, preferably of from 20 to 90;

solubility in pentane at 20° C. generally greater than 80% by weight;

tension set at 200% (measured at 20° C. for 1 minute according to ASTM standard D 412) lower than 30%.

Tension set provides a measure of the elastic recovery properties of the non-crosslinked material. This is determined by subjecting a sample of the tested material to a tensile force such as to obtain an elongation of 200% for a predetermined period. After removing the stress, the permanent deformation of the sample, which is expressed as a percentage relative to its initial dimensions, is measured: the smaller this value, the better the elastic properties of the material.

The copolymers belonging to group (b1) generally have the following composition: 35–90% by mole of ethylene; 10–65% by mole of alpha-olefin, preferably propylene; 0–10% by mole of a diene, preferably 1,4-hexadiene or 5-ethylidene-2-norbornene. When the alpha-olefin is propylene, the monomer composition is preferably as follows: 55–80% by weight, preferably 65–75% by weight, of ethylene; 20–45% by weight, preferably 25–35% by weight, of propylene; 0–10% by weight, preferably 0–5% by weight, of a diene (preferably 5-ethylene-2-norbornene). When the alpha-olefin is propylene, the propylene units are in the form of triads generally in amounts of between 4 and 50% by mole with respect to the total amount of propylene, and at least 70% of these triads have isotactic structure, as shown by $^{13}$C-NMR analysis.

The second group (b2) consists of copolymers of ethylene with at least one $C_4$–$C_{12}$ alpha-olefin, preferably 1-octene, and optionally a diene, preferably characterized by:

a density of between 0.86 and 0.90 g/cm$^3$;

a melting enthalpy of between 30 and 60 J/g;

Melt Flow Index (MFI), measured according to ASTM standard D 1238/L, of between 0.1 and 30 g/10 min, preferably between 0.5 and 5 g/10 min.

The copolymers belonging to group (b2) generally have the following composition: 75–97% by mole, preferably 90–95% by mole, of ethylene; 3–25% by mole, preferably 5–10% by mole, of alpha-olefin; 0–5% by mole, preferably 0–2% by mole, of a diene.

The copolymers (b) can be obtained by copolymerization of ethylene with an alpha-olefin, and optionally with a diene, in the presence of a "single-site" catalyst, for example a metallocene catalyst, as described, e.g., in patent applications WO 93/19107 and EP-A-632,065 (for the copolymers of group (b1)) or in patents U.S. Pat. Nos. 5,246,783 and 5,272,236 (for the copolymers of group (b2)). The metallocenes used to polymerize the olefins are coordination complexes of a transition metal, usually of Group IV, in particular titanium, zirconium or hafnium, with two optionally substituted cyclopentadienyl ligands, used in combination with a co-catalyst, for example an alumoxane, preferably methylalumoxane, or a boron compound (see for example J. M. S.-Rev. Macromol. Chem. Phys., C34(3), 439–514 (1994); J. Organometallic Chemistry, 479 (1994), 1–29, or patents U.S. Pat. Nos. 5,272,236, 5,414,040 and 5,229,478, or the above-mentioned patent applications WO 93/19107 and EP-A-632065, and patents U.S. Pat. Nos. 5,246,783 and 5,272,236). Catalysts which are suitable for obtaining the copolymers (b) according to the present invention are also the so-called "Constrained Geometry Catalysts" described, for example, in patents EP-416,815 and EP-418,044.

The crystalline propylene homopolymers or copolymers (a) generally have a melting enthalpy greater than 75 J/g, preferably greater than 85 J/g. They may be selected in particular from:

(1) isotactic propylene homopolymers with an isotacticity index greater than 80, preferably greater than 90, even more preferably greater than 95;

(2) propylene homopolymers obtainable by using metallocene catalysts, having a pentad mmmm content greater than 90% (determined by $^{13}$C-NMR analysis);

(3) crystalline copolymers of propylene with ethylene and/or an alpha-olefin having from 4 to 10 carbon atoms, with an overall content of ethylene and/or alpha-olefin lower than 10% by mole;

(4) heterophasic propylene copolymers obtainable by polymerization in sequence of propylene and of mixtures of propylene with ethylene and/or an alpha-olefin having from 4 to 10 carbon atoms, containing at least 70% by weight of polypropylene homopolymer or of crystalline propylene/ethylene copolymer, with an isotacticity index greater than 80, the remainder consisting of an elastomeric ethylene/propylene copolymer with a propylene content of between 30 and 70% by weight;

(5) crystalline propylene homopolymers or copolymers having syndiotactic structure obtainable by using metallocene catalysts.

The amount of magnesium hydroxide which is suitable for imparting the desired flame-retardant properties can vary within a wide range, generally between 10 and 90% by weight, preferably between 30 and 80% by weight, with respect to the total weight of the composition.

Other fillers with flame-retardant properties can optionally be added to the natural magnesium hydroxide, for example aluminium hydroxide or alumina trihydrate ($Al_2O_3.3H_2O$). One or more inorganic oxides or salts such as $CoO$, $TiO_2$, $Sb_2O_3$, $ZnO$, $Fe_2O_3$, $CaCO_3$ or mixtures thereof can advantageously also be added in small amounts, generally less than 25% by weight.

With the aim of improving compatibility between magnesium hydroxide and polymer matrix, a coupling agent capable of increasing the interaction between the hydroxyl groups of magnesium hydroxide and the polyolefin chains may be added to the mixture. This coupling agent can be selected from those known in the art, for example: saturated silane compounds or silane compounds containing at least one ethylenic unsaturation; epoxides containing an ethylenic unsaturation; monocarboxylic acids or, preferably, dicarboxylic acids having at least one ethylenic unsaturation, or derivatives thereof, in particular anhydrides or esters.

Examples of silane compounds which are suitable for this purpose are: γ-methacryloxypropyl-trimethoxysilane, methyltriethoxysilane, methyltris (2-methoxyethoxy)silane, dimethyldiethoxysilane, vinyltris (2-methoxyethoxy)silane, vinyltrimethoxysilane, vinyltriethoxysilane, octyltriethoxysilane, isobutyltriethoxysilane, isobutyltrimethoxysilane and mixtures thereof.

Examples of epoxides containing an ethylenic unsaturation are: glycidyl acrylate, glycidyl methacrylate, monoglycidyl ester of itaconic acid, glycidyl ester of maleic acid, vinyl glycidyl ether, allyl glycidyl ether, or mixtures thereof.

Monocarboxylic or dicarboxylic acids, having at least one ethylenic unsaturation, or derivatives thereof, which can be used as coupling agents are, for example: maleic acid, maleic anhydride, fumaric acid, citraconic acid, itaconic acid, acrylic acid, methacrylic acid and the like, and anhydrides or esters derived therefrom, or mixtures thereof. Maleic anhydride is particularly preferred.

The coupling agents can be used as such or pre-grafted onto a polyolefin, for example polyethylene or copolymers of ethylene with an alpha-olefin, by means of a radicalic reaction (see for example patent EP-530,940). The amount of grafted coupling agent is generally between 0.05 and 5 parts by weight, preferably between 0.1 and 2 parts by weight, with respect to 100 parts by weight of polyolefin. Polyolefins grafted with maleic anhydride are available as commercial products known, for example, under the trademarks Fusabond® (Du Pont), Orevac® (Elf Atochem), Exxelor® (Exxon Chemical), Yparex® (DSM), etc.

Alternatively, the coupling agents of carboxylic or epoxide type mentioned above (for example maleic anhydride) or the silanes with ethylenic unsaturation (for example vinyltrimethoxysilane) may be added to the mixture in combination with a radical initiator so as to graft the compatibilizing agent directly onto the polymer matrix. An organic peroxide such as tert-butyl perbenzoate, dicumyl peroxide, benzoyl peroxide, di-tert-butyl peroxide and the like can, for example, be used as initiator. This method is described, for example, in patent U.S. Pat. No. 4,317,765 or in Japanese patent application JP-62-58774.

The amount of coupling agent that can be added to the mixture can vary mainly depending on the type of coupling agent used and on the amount of magnesium hydroxide added, and is generally between 0.01 and 5%, preferably between 0.05 and 2%, by weight relative to the total weight of the base polymer mixture.

Other conventional components such as antioxidants, processing coadjuvants, lubricants, pigments, other fillers and the like can be added to the compositions of the present invention.

Conventional antioxidants which are suitable for this purpose are, for example: polymerized trimethyldihydroquinoline, 4,4'-thiobis(3-methyl-6-tert-butyl)phenol; pentaerythritol tetrakis[3-(3,5-di-tert-butyl-4-hydroxyphenyl)propionate], 2,2'-thio-diethylene-bis-[3-(3,5-di-tert-butyl-4-hydroxy-phenyl)propionate] and the like, or mixtures thereof.

Other fillers which may be used in the present invention include, for example, glass particles, glass fibres, calcined kaolin, talc and the like, or mixtures thereof. Processing co-adjuvants usually added to the polymer base are, for example, calcium stearate, zinc stearate, stearic acid, paraffin wax, silicone rubbers and the like, or mixtures thereof.

The flame-retardant compositions according to the present invention can be prepared by mixing the polymer components and the additives according to methods known in the art. The mixing can be carried out, for example, using an internal mixer of the type with tangential rotors (Banbury) or with interpenetrating rotors, or alternatively in continuous mixers such as those. of the type Ko-Kneader (Buss), or of the type co-rotating or counter-rotating twin-screw. The flame-retardant compositions according to the present invention are preferably used in non-crosslinked form, to obtain a coating with thermoplastic properties and thus recyclable.

It is also possible to carry out a partial crosslinking of the polymer matrix according to methods known in the art, in particular by dynamic crosslinking, i.e. by adding a suitable radical initiator to the mixture during processing, for example an organic peroxide, optionally in the presence of a crosslinking co-agent such as, for example, 1,2-polybutadiene, triallylcyanurate or triallyl-isocyanurate. Dynamic crosslinking techniques are described, for example, in patents U.S. Pat. No. Re. 31,518, U.S. Pat. Nos. 4,130,535, 4,348,459, 4,948,840, 4,985,502, EP-618,259. The mixture is processed at the vulcanization temperature specific to the radical initiator used, using a conventional mixer chosen, for example, from those mentioned above. At the end of the dynamic crosslinking, a partially crosslinked material is obtained in which thermoplastic properties and thus processability are retained, since a crosslinked phase is formed consisting of ethylene/alpha-olefin or ethylene/alpha-olefin/diene copolymer, which is dispersed in a thermoplastic phase consisting of non-crosslinked polypropylene. A person skilled in the art will be able to dose the radical initiator and the optional crosslinking co-agent suitably depending both on the specific conditions under which the dynamic crosslinking is carried out, and on the properties desired for the final product, in particular as regards the crosslinking degree.

As an alternative to organic peroxides, dynamic crosslinking can be carried out in the presence of non-peroxidic radical initiators, such as alkyl derivatives of 1,2-diphenylethane (see for example patent EP-542,253)

The polymer mixtures, optionally partially crosslinked as described above, can then be used to coat the conductor directly, or to make an outer sheath on the conductor previously coated with an insulating layer. This step can be carried out, for example, by extrusion. When two layers are present, the extrusion can be carried out in two separate stages, extruding the inner layer onto the conductor in a first run and the outer layer onto this inner layer in a second run. Advantageously, the coating process can be carried out in a single run, for example by means of a "tandem" method, in which two separate extruders arranged in series are used, or alternatively by co-extrusion using a single extrusion head.

The following working examples are given to illustrate the present invention more clearly.

The following types of magnesium hydroxide were used as flame-retardant fillers:

TABLE 1

| Name | Type | Conductivity of the aqueous extract ($\mu$S/cm) | Specific surface ($m^2/g$) | Particle size curve ($\mu$m) | | |
|---|---|---|---|---|---|---|
| | | | | 10% | 50% average | 90% |
| Kisuma ® 5A | synthetic | 74 | 7.1 | 0.8 | 1.6 | 3.1 |
| Hydrofy ® G-2.5 | natural | 135 | 8.2 | 0.5 | 2.6 | 9.8 |
| Hydrofy ® G-1.5 | natural | 190 | 10.4 | 0.7 | 2.1 | 6.4 |

The products Kisuma® 5A (from the company Kyowa. Chemical Ind.) and Hydrofy® GS-1.5 (from the company SIMA) are surface-treated with stearic acid, while the product Hydrofy® G-2.5 (SIMA) is untreated.

The specific surface was measured by the BET method. The samples were previously subjected to a treatment under vacuum at a temperature of 130° C. for 24 hours to eliminate any adsorbed extraneous products, and then nitrogen was adsorbed (adsorption isotherm at −196° C., assuming an area of 16.2 Å$^2$ for the nitrogen molecule; apparatus used: Sorptomatic 1900—Carlo Erba).

The particle size distribution curve was obtained from suspensions of the samples of magnesium hydroxide in ethanol, using a helium-neon laser diffraction granulometer (Cilas-Alcatel Model HR850). The measurements were taken after ultrasonic treatment with stirring for 120 sec to ensure complete deflocculation of the test samples. The average particle diameter was obtained from the cumulative particle size distribution curves.

The content of water-soluble impurities was evaluated indirectly by measuring the conductivity of the aqueous extract, namely of an aqueous solution left in contact with the magnesium hydroxide for a predetermined period of time. In particular, the test was carried out in the following way.

20.0±0.1 g of magnesium hydroxide are suspended in 40 ml of ethanol with stirring. 160 ml of deionized water (conductivity of less than 1.5 $\mu$S/cm) are then added and the suspension is stirred using a magnetic stirrer for one hour. The suspension is subsequently filtered to separate out the magnesium hydroxide. A measurement of conductivity (A) is carried out on the resulting solution and is compared with the conductivity (B) of a solution consisting of 40 ml of ethanol in 160 ml of deionized water. The conductivity of the aqueous extract (C) is then calculated as:

$C=A-B(\mu S/cm)$.

As regards the polymeric products, the reported properties were obtained as follows:

second melting enthalpy ($\Delta H_{2m}$) and second melting point ($T_{2m}$): obtained by differential scanning calorimetry (DSC) with a scanning speed of 10° C./min;

Melt Flow Index (MFI): measured according to ASTM standard D 1238/L (at 230° C. and 21.6 N for polypropylene, and at 190° C. and 21.6 N for ethylene/1-octene copolymers);

composition distribution index (CDI): determined by temperature rising elution fractionation methods.

Preparation of the Flame-retardant Compositions

The mixtures of Examples 1–12 and 23–24 were prepared in a closed Banbury mixer (volume of the mixing chamber: 1200 cm$^3$) with a volume filling of 95%. The mixing was carried out at a temperature of 200° C. for a total time of 10 min (rotor speed: 44 revolutions/min). The Mooney viscosity of the resulting mixture was determined at 130° C. according to ASTM standard D-1646.

The mixtures of Examples 13–22 were prepared in a Brabender mixer (volume of the mixing chamber: 80 cm$^3$) filled to a volume filling of 95%. The mixing was carried out at a temperature of 170° C. for a total time of 10 min (rotor speed: 40 revolutions/min). At the end the final torque was measured under the above-mentioned mixing conditions.

Mechanical Properties

The flame-retardant compositions were subjected to mechanical tensile strength tests according to CEI standard 20-34, §5.1 on specimens taken from 1 mm-thick plates obtained by compression moulding at 190–195° C. and 200 bar after preheating for 5 min at the same temperature.

The same mechanical strength tests were carried out on cable specimens obtained by extruding the mixtures onto a single wire of red copper (section 1.5 mm$^2$; diameter: 1.4 mm) in an extruder with a cylinder having a 45 mm diameter and with a length equal to 25 diameters (final thickness of the insulating layer: 0.7 mm).

Measurement of Oxygen Index (LOI)

The oxygen index was measured, according to ASTM standard D 2863, on plates obtained as described for the mechanical tests, but with a thickness of 3 mm.

Measurement of Flame-resistance

The cable specimens prepared as described above were subjected to the flame-resistance test according to CEI standard 332-1, which consists in subjecting a 60 cm long sample, placed vertically, to the direct action of a Bunsen flame applied for 1 min at an inclination of 45° relative to the sample.

Measurement of Insulation Constant (Ki)

The insulation constant (Ki) at 20° C. was measured according to CEI standard 20-11 B6, on a cable specimen obtained as described above.

EXAMPLES 1–4

(Comparative)

For comparative purposes, a number of flame-retardant compositions were prepared according to the prior art, in which the polymer base consisted of a mixture of two ethylene/vinyl acetate copolymers with linear low density polyethylene (LLDPE), using. magnesium hydroxide of natural origin or synthetic magnesium hydroxide. The compositions (in phr, i.e. parts by weight per 100 parts of polymer matrix) and the results of the mechanical strength and flame resistance tests as described above are given in Table 2.

TABLE 2

| | EXAMPLE | | | |
|---|---|---|---|---|
| | 1 (*) | 2 (*) | 3 (*) | 4 (*) |
| Elvax ® 40L-03 | — | 30.00 | — | 30.00 |
| Escorene ® UL 00119 | 70.00 | 30.00 | 70.00 | 30.00 |

TABLE 2-continued

|  | EXAMPLE | | | |
|---|---|---|---|---|
|  | 1 (*) | 2 (*) | 3 (*) | 4 (*) |
| Stamylex ® 08-026 | 20.00 | 20.00 | 20.00 | 20.00 |
| Exxelor ® VA 1803 | 10.00 | 20.00 | 10.00 | 20.00 |
| Irganox ® 1010 | 0.60 | 0.60 | 0.60 | 0.60 |
| Kisuma ® 5A | 160.00 | 190.00 | — | — |
| Hydrofy ® GS-1.5 | — | — | 160.00 | 190.00 |
| Total | 260.60 | 290.60 | 260.60 | 290.60 |
| Mooney viscosity ML (1+4) at 130° C. | 56.2 | 67.8 | 59.2 | 73.9 |
| Properties on plates | | | | |
| Modulus at 20% (MPa) | 8.1 | 3.2 | 8.0 | 3.4 |
| Stress at break (MPa) | 9.5 | 8.7 | 8.6 | 8.1 |
| Elongation at break (%) | 140 | 145 | 110 | 112 |
| LOI (% O2) | 40 | 41 | 35 | 37 |
| Properties on cable specimens | | | | |
| Modulus at 20% (MPa) | 7.5 | 5.2 | 8.1 | 6.5 |
| Stress at break (MPa) | 10.8 | 10.7 | 8.6 | 8.7 |
| Elongation at break (%) | 178 | 199 | 83 | 119 |
| Flame resistance | yes | yes | no | no |

(*) comparative

Elvax® 40L-03—ethylene/vinyl acetate (VA) copolymer:
  40 wt % VA; d=0.98 g/cm$^3$; MFI=7.5 g/10';

Escorene® UL 00119—ethylene/VA copolymer:
  19 wt % VA; d=0.941 g/cm$^3$; MFI=0.7 g/10';

Stamylex® 08-026—linear low density polyethylene obtained using a titanium Ziegler-Natta catalyst:
  d=0.911 g/cm$^3$; MFI=2.2 g/10'; $T_{2m}$=123° C.;

Exxelor® VA 1803—ethylene/propylene copolymer grafted with maleic anhydride (MA):
  0.7 wt % MA; d=0.86 g/cm$^3$; MFI=3 g/10';

Irganox® 1010—antioxidant:
  pentaerythrityl tetrakis[3-(3,5-di-tert-butyl-4-hydroxyphenyl)propionate] (Ciba-Geigy).

The results given in Table 2 clearly demonstrate that natural magnesium hydroxide used in combination with conventional polymer mixtures does not give satisfactory results in terms both of mechanical properties and of flame resistance, whereas good results are obtained with synthetic magnesium hydroxide (used in the same amount in the mixture).

In particular, it is believed that the poor results obtained with natural magnesium hydroxide, in terms of fire resistance, are due to the poor dispersion of this magnesium hydroxide in the polymer mixture.

EXAMPLES 5–8

A number of flame-retardant compositions were prepared, in which the polymer base consisted of a mixture of polypropylene (Moplen® EP 1X 35 HF—Montell) and an ethylene/1-octene copolymer (Engage® 8003—Du Pont-Dow Elastomers) obtained by metallocene catalysis, with uniform distribution of the 1-octene comonomer between the copolymer molecules (composition distribution index (CDI) >70%). Natural magnesium hydroxide or synthetic magnesium hydroxide was used as flame-retardant filler. The compositions, in phr, and the results of the mechanical strength and flame re-sistance tests as described above are given in Table 3.

TABLE 3

|  | EXAMPLE | | | |
|---|---|---|---|---|
|  | 5 | 6 (*) | 7 | 8 (*) |
| Engage ® 8003 | 50.00 | 50.00 | 80.00 | 80.00 |
| Moplen ® EP1X35HF | 25.00 | 25.00 | 10.00 | 10.00 |
| Orevac ® 18303 | 25.00 | 25.00 | 10.00 | 10.00 |
| Irganox ® 1010 | 0.50 | 0.50 | 0.50 | 0.50 |
| Rhodorsil ® MF175U | 1.50 | 1.50 | 1.50 | 1.50 |
| Kisuma ® 5A | — | 160.00 | — | 160.00 |
| Hydrofy ® G-2.5 | 160.00 | — | 160.00 | — |
| Total | 262.00 | 262.00 | 262.00 | 262.00 |
| Properties on plates | | | | |
| LOI (% O$_2$) | 30 | 34 | 28 | 31 |
| Properties on cable specimens | | | | |
| Ki at 20° C. (MOhm · km) | 14400 | 158.00 | — | — |
| Ki at 70° C. (MOhm · km) | 1600 | 2460 | — | — |
| Modulus at 20% (MPa) | 11.2 | 10.9 | 8.1 | 7.1 |
| Stress at break (MPa) | 13.7 | 17.5 | 10.6 | 13.5 |
| Elongation at break (%) | 155 | 347 | 416 | 543 |
| Flame resistance | yes | yes | yes | yes |

(*) comparative

Engage® 8003—ethylene/1-octene copolymer obtained by metallocene catalysis:
  ethylene/1-octene weight ratio=82/18 (5.5% by mole of 1-octene); d=0.885 g/cm$^3$; MFI=1.0 g/10'; CDI>70%; $\Delta H_{2m}$=55.6 J/g;

Moplen® EP1X35HF—propylene/ethylene random crystalline copolymer:
  d=0.900 g/cm$^3$; MFI=9.0 g/10'; $T_{2m}$=154° C.; $\Delta H_{2m}$=90.6 J/g;

Orevac® 18303—LLDPE grafted with maleic anhydride (MA):
  0.3 wt % MA; d=0.917 g/cm$^3$; MFI=2 g/10';

Irganox® 1010—see Table 2;

Rhodorsil® MF175U—processing coadjuvant/lubricant (silicone rubber—Rhone Poulenc).

EXAMPLES 9–12

Flame-retardant compositions were prepared in which the polymer base consisted of a mixture of polypropylene (Moplen® EP1X35HF—Montell) and an ethylene/propylene/5-ethylidene-2-norbornene elastomeric terpolymer (EPDM 1) obtained by metallocene catalysis as described in patent application EP-A-632,065, with uniform distribution of the alpha-olefin among the terpolymer molecules (CDI>70%). Natural magnesium hydroxide or synthetic magnesium hydroxide was usedas flame-retardant filler.

For comparative purposes, the same compositions were prepared using, in place of the EPDM 1 terpolymer, an ethylene/propylene/diene elastomeric terpolymer. EPDM 2 obtained by vanadium Ziegler-Natta catalysis (product Nordel® 2722—Du Pont—Dow Elastomers) (CDI<40%).

The compositions, in phr, and the results of the mechanical strength and flame resistance tests as described above are given in Table 4.

TABLE 4

|  | EXAMPLE | | | |
| --- | --- | --- | --- | --- |
|  | 9 | 10 (*) | 11 (*) | 12 (*) |
| EPDM 1 | 75.00 | 75.00 | — | — |
| EPDM 2 | — | — | 75.00 | 75.00 |
| Moplen ® EP1X35HF | 10.00 | 10.00 | 10.00 | 10.00 |
| Orevac ® 18303 | 15.00 | 15.00 | 15.00 | 15.00 |
| Irganox ® 1010 | 0.50 | 0.50 | 0.50 | 0.50 |
| Rhodorsil ® MF175U | 1.50 | 1.50 | 1.50 | 1.50 |
| Kisuma ® 5A | — | 160.00 | — | 160.00 |
| Hydrofy ® G-2.5 | 160.00 | — | 160.00 | — |
| Total | 262.00 | 262.00 | 262.00 | 262.00 |
| Properties on plates | | | | |
| LOI (% $O_2$) | 30 | 33 | 28 | 34 |
| Properties on cable specimens | | | | |
| Modulus at 20% (MPa) | 9.4 | 7.2 | 8.2 | 7.5 |
| Stress at break (MPa) | 12.0 | 14.1 | 7.6 | 11.3 |
| Elongation at break (%) | 185 | 305 | 40 | 115 |
| Flame resistance | yes | yes | no | yes |

(*) comparative

EPDM 1—ethylene/propylene/5-ethylidene-2-norbornene elastomeric terpolymer obtained by metallocene catalysis as described in EP-A-632,065:
ethylene/propylene/diene weight ratio=70/27/3;
intrinsic viscosity [η]=5.1 (measured in tetralin at 135° C.); Mooney viscosity ML(1+4)=25, measured according to ASTM D1646; d=0.870 g/cm$^3$; CDI>70%; $\Delta H_{2m}$=15 J/g;
$M_w/M_n$=2; inversions<1%; tension set at 200% (20° C./1 min—ASTM standard D412): 20%;

EPDM 2—ethylene/propylene/diene elastomeric terpolymer obtained by vanadium Ziegler-Natta catalysis (product Nordel® 2722):
ethylene/propylene/diene weight ratio=72/24/4;
d=0.880 g/cm$^3$; CDI<40%; $\Delta H_{2m}$=29.4 J/g; $M_w/M_n$= 4.5;
inversions 11%; tension set at 200% (20° C./1 min—ASTM standard D412): 40%;

Moplen® EP1X35HF—see Table 3;
Orevac® 18303—see Table 3;
Irganox® 1010—see Table 2;
Rhodorsil® MF175U—see Table 3.

EXAMPLES 13–18

Flame-retardant compositions were prepared in which the polymer base consisted of a mixture of polypropylene (Moplen® EP 2S30B—Montell) and two different ethylene/1-octene copolymers obtained by metallocene catalysis (Engage® 8003 and Engage® 8150 from Du Pont-Dow Elastomers) (CDI>70%), using natural magnesium hydroxide as flame-retardant filler.

For comparative purposes, the same compositions were prepared using, in place of the Engage® copolymers, an ethylene/1-octene copolymer obtained by titanium Ziegler-Natta catalysis (product Stamylex® TMX 100 from DSM—CDI<40%).

To evaluate any variations in the mechanical properties due to the introduction of the flame-retardant filler, the same compositions were prepared but without filler (Examples 13, 15 and 17).

The compositions, in phr, and the results of the mechanical strength and flame resistance tests as described above are given in Table 5.

TABLE 5

|  | EXAMPLE | | | | | |
| --- | --- | --- | --- | --- | --- | --- |
|  | 13 (*) | 14 | 15 (*) | 16 | 17 (*) | 18 (*) |
| Moplen ® S30G | — | — | — | — | — | — |
| Moplen ® EP2S30B | 35 | 35 | 35 | 35 | 35 | 35 |
| Engage ® 6003 | 65 | 65 | — | — | — | — |
| Engage ® 8150 | — | — | 65 | 65 | — | — |
| Stamylex ® TMX 1000 | — | — | — | — | 65 | 65 |
| Hydrofy ® G-1.5 | — | 160 | — | 160 | — | 160 |
| Rhodorsil ® MF175U | — | 1.5 | — | 1.5 | — | 1.5 |
| Irganox ® PS 802FL | — | — | — | — | — | — |
| Irganox ® 1010 | — | 0.5 | — | 0.5 | — | 0.5 |
| Final torque (N · m) | 6.2 | 9.8 | 7.8 | 11.2 | 6.1 | 7.3 |
| Properties on plates | | | | | | |
| Stress at break (MPa) | 16.7 | 10.5 | 17.5 | 10.4 | 6.9 | 5.5 |
| Elongation at break (%) | 662 | 567 | 713 | 621 | 711 | 54 |
| Modulus at 20% (MPa) | 6.0 | 5.6 | 4.8 | 4.7 | 8.0 | 6.6 |

(*) comparative

Moplen® S30G—isotactic polypropylene (homopolymer):
d=0.900 g/cm$^3$; MFI=1.6 g/10'; $\Delta H_{2m}$=98 J/g;
Moplen EP2S30B—propylene/ethylene random crystalline copolymer:
d=0.900 g/cm$^3$; MFI=1.8 g/10'; $\Delta H_{2m}$=90 J/g;
Engage® 8003—see Table 2;
Engage® 8150—ethylene/1-octene copolymer obtained by metallocene catalysis:
ethylene/1-octene weight ratio=75/25 (7.6% by mole of 1-octene); d=0.868 g/cm$^3$; MFI=0.5 g/10'; CDI>70%;
$\Delta H_{2m}$=34.4 J/g;
Stamylex® TMX 1000—ethylene/1-octene copolymer obtained by titanium Ziegler-Natta catalysis:
4.6% by mole of 1-octene; d=0.902 g/cm$^3$; CDI<40%; MFI=3.0 g/10'; $\Delta H_{2m}$=78.0 J/g;
Rhodorsil® MF175U—see Table 4;
Irganox® PS802 FL—antioxidant:
distearylthiodipropionate (DSTDP) (Ciba-Geigy);
Irganox® 1010—see Table 2.

EXAMPLES 19–22

Flame-retardant compositions were prepared in which the polymer base consisted of a mixture of polypropylene (Moplen® EP 2S30B—Montell) and the same ethylene/propylene/5-ethylidene-2-norbornene elastomeric terpolymer (EPDM 1) as in Examples 9 and 10, obtained by metallocene catalysis, using natural magnesium hydroxide as flame-retardant filler.

For comparative purposes, the same compositions were prepared using, instead of the terpolymer EPDM 1, the ethylene/propylene/diene elastomeric terpolymer EPDM 2 of Examples 11 and 12, obtained by vanadium Ziegler-Natta catalysis (product Nordel® 2722—Du Pont-Dow Elastomers).

To evaluate any variations in mechanical properties due to the introduction of the flame-retardant filler, the same compositions were prepared but without filler

EXAMPLES 19 AND 21

The compositions, in phr, and the results of the mechanical strength and flame resistance tests as described above are given in Table 6.

TABLE 6

|  | EXAMPLE | | | |
|---|---|---|---|---|
|  | 19 (*) | 20 | 21 (*) | 22 (*) |
| Moplen ® EP 2S30B | 35 | 35 | 35 | 35 |
| EPDM 1 | 65 | 65 | — | — |
| EPDM 2 | — | — | 65 | 65 |
| Hydrofy ® GS-1.5 | — | 160 | — | 160 |
| Rhodorsil ® MF175U | — | 1.5 | — | 1.5 |
| Irganox ® PS 802FL | — | — | — | — |
| Irganox ® 1010 | — | 0.5 | — | 0.5 |
| Final torque (N · m) | 10.0 | 10.8 | 9.0 | 14.1 |
| Properties on plates |  |  |  |  |
| Stress at break (MPa) | 14.7 | 5.1 | 12.6 | 3.7 |
| Elongation at break (%) | 806 | 471 | 731 | 112 |
| Modulus at 20% (MPa) | 5.2 | 14.5 | 7.2 | 4.4 |

(*) comparative

As a comment to the results given in Tables 2–6, it can be noticed that, according to the experiments carried out by the Applicant and in confirmation of the teachings obtainable from the prior art, the use of natural magnesium hydroxide as flame-retardant filler for polyolefin-based compositions of conventional type, obtained by (co)polymerization of the corresponding olefins in the presence of conventional Ziegler-Natta catalysts, i.e. not "single-site" catalysts, leads to a remarkable reduction in flexibility and mechanical strength properties of the material, as demonstrated by low values of stress at break and elongation at break. Moreover, the flame-retardant effect which can be obtained is, in any event, modest, as demonstrated by the measurements of oxygen index and of direct combustion by flame.

Conversely, according to the present invention, the Applicant has found that compositions comprising natural magnesium hydroxide and a polymer mixture of polypropylene and an ethylene/alpha-olefin or ethylene/alpha-olefin/diene copolymer, with uniform distribution of the alpha-olefin among the copolymer molecules, are characterized by very good mechanical and elastic properties, that are comparable to those obtainable by using synthetically produced (by precipitation) magnesium hydroxide as flame-retardant filler. Improved processability of the polymer mixture has also been observed, as demonstrated by low values of torque measured on systems filled with magnesium hydroxide after the mixing process, these values being essentially unchanged with respect to mixtures which do not contain flame-retardant fillers. Moreover, these mixtures, and the cables made therefrom, have excellent flame-retardant properties, which are essentially comparable to those of mixtures and cables using synthetic magnesium hydroxide; one interpretation of this result is that, in particular by virtue of the choice of ethylene/alpha-olefin or ethylene/alpha-olefin/diene copolymer, the mixture according to the present invention allows better and more homogeneous dispersion of the magnesium hydroxide in the polymer bulk.

EXAMPLES 23–24

Cable specimens were prepared as described above for mechanical tests, using the compositions given in Table 7. These cables were subjected to the thermocompression test according to CEI standard 20-34/3-1 at increasing temperatures. The results are reported in Table 7.

TABLE 7

|  | EXAMPLE | |
|---|---|---|
|  | 23 | 24 (*) |
| Engage ® 8003 | 50.00 | 75.00 |
| Moplen ® EP1X35HF | 25.00 | — |
| Orevac ® 18303 | 25.00 | 25.00 |
| Anox ® 20 | 0.8 | 0.50 |
| Rhodorsil ® MF175U | 1.50 | 1.50 |
| Hydrofy ® G-2.5 | 160.00 | 160.00 |
| Total | 262.30 | 262.30 |
| Thermocompression tests | | |
| Temperature | % residual thickness | % residual thickness |
| 80° C. | 97.2 | 84.5 |
| 90° C. | 90.0 | 73.3 |
| 100° C. | 77.3 | 20.2 |
| 110° C. | 58.1 | pierced |

(*) comparative

As can be noticed, the composition containing polypropylene passes the thermocompression test even at 100–110° C., whereas the composition devoid of polypropylene fails the test even at 100° C. and there is complete piercing at 110° C.

What is claimed is:

1. A cable with self-extinguishing properties, comprising:
   a conductor; and
   a flame-retardant coating;
   wherein the flame-retardant coating comprises:
   (a) a crystalline propylene homopolymner or copolymer;
   (b) a copolymer of ethylene with at least one alpha-olefin, and optionally with a diene, the copolymer (b) being characterized by a composition distribution index greater than 45%, the index being defined as a weight percentage of copolymer molecules having an alpha-olefin content within 50% of an average total molar content of alpha-olefin; and
   (c) natural magnesium hydroxide in an amount such as to impart flame-retardant properties.

2. The cable of claim 1, wherein an electrically insulating inner layer is present and wherein the flame-retardant coating is placed externally to the inner layer.

3. The cable of claim 1, wherein the flame-retardant coating is placed on the conductor.

4. The cable of claim 1, wherein the magnesium hydroxide (c) has a specific surface between 5 $m^2/g$ and 20 $m^2/g$.

5. The cable of claim 4, wherein the magnesium hydroxide (c) has a specific surface between 6 $m^2/g$ and 15 $m^2/g$.

6. The cable of claim 1, wherein the magnesium hydroxide (c) has an average particle diameter between 1 $\mu m$ and 15 $\mu m$, and a particle size distribution such that not more than 10% of a total number of particles have a diameter lower than 1.5 μm and not more than 10% of the total number of particles have a diameter greater than 20 μm.

7. The cable of claim 1, having an electrical conductivity of aqueous extract obtained from the magnesium hydroxide (c) between 100 μS/cm and 500 μS/cm.

8. The cable of claim 7, wherein the electrical conductivity of the aqueous extract obtained from the magnesium hydroxide (c) is between 120 μS/cm and 350 μS/cm.

9. The cable of claim 1, wherein the magnesium hydroxide (c) is used as such.

10. The cable of claim 1, wherein the magnesium hydroxide (c) is used in a form of particles surface-treated with saturated or unsaturated fatty acids containing from 8 to 24 carbon atoms, or metal salts thereof.

11. The cable of claim 1, wherein the magnesium hydroxide is surface-treated with a coupling agent.

12. The cable of claim 11, wherein the coupling agent is an organosilane or organotitanate.

13. The cable of claim 1, wherein in the copolymer (b) the alpha-olefin has a formula $CH_2=CH-R$, where R is a linear or branched alkyl having from 1 to 10 carbon atoms.

14. The cable of claim 1, wherein the copolymer (b) has a molecular weight distribution index lower than 5.

15. The cable of claim 14, wherein the copolymer (b) has a molecular weight distribution index from 1.5 to 3.5.

16. The cable of claim 1, wherein the copolymer (b) is obtainable by copolymerization of ethylene with at least one $C_3-C_{12}$ alpha-olefin, and optionally with a diene, by means of a single-site catalyst.

17. The cable of claim 16, wherein the single-site catalyst is a metallocene catalyst.

18. The cable of claim 16, wherein the single-site catalyst is a constrained-geometry catalyst.

19. The cable of claim 1, wherein the copolymer (b) is a copolymer of ethylene with at least one $C_3-C_{12}$ alpha-olefin, and optionally a diene, the copolymer (b) having elastomeric properties.

20. The cable of claim 19, wherein the copolymer (b) has a melting enthalpy lower than 35 J/g.

21. The cable of claim 19, wherein the copolymer (b) has an intrinsic viscosity in tetralin at 135° C. greater than 1.0 dl/g.

22. The cable of claim 19, wherein the copolymer (b) has a Mooney viscosity ML(1+4) at 125° C., measured according to ASTM standard D 1646, greater than 10.

23. The cable of claim 19, wherein the copolymer (b) has a solubility in pentane at 20° C. greater than 80% by weight.

24. The cable of claim 19, wherein the copolymer (b) has a value of tension set at 200%, measured at 20° C. for 1 minute according to ASTM standard D 412, lower than 30%.

25. The cable of claim 19, wherein the copolymer (b) is a copolymer of 35%–90% by mole of ethylene, 10%–65% by mole of alpha-olefin, and 0%–10% by mole of diene.

26. The cable of claim 19, wherein the alpha-olefin is propylene.

27. The cable of claim 26, wherein the copolymer (b) is a copolymer of 55%–80% by weight of ethylene, 20%–45% by weight of propylene, and 0%–10% by weight of diene.

28. The cable of claim 27, wherein the copolymer;(b) is a copolymer of 65%–75% by weight of ethylene, 25%–35% by weight of propylene, and 0%–5% by weight of diene.

29. The cable of claim 1, wherein the copolymer (b) is a copolymer of ethylene with at least one $C_4-C_{12}$ alpha-olefin, and optionally a diene, the copolymer (b) having a density from 0.86 g/cm$^3$ to 0.90 g/cm$^3$.

30. The cable of claim 29, wherein the copolymer (b) has a melting enthalpy from 30 J/g to 60 J/g.

31. The cable of claim 29, wherein the copolymer (b) has a melt flow index, measured according to ASTM standard D 1238/L, from 0.1 g/10 min to 30 g/10 min.

32. The cable of claim 29, wherein the copolymer (b) is a copolymer of 75%–97% by mole of ethylene, 3%–25% by mole of alpha-olefin, and 0%–5% by mole of diene.

33. The cable of claim 32, wherein the copolymer (b) is a copolymer of 90%–95% by mole of ethylene, 5%–10% by mole of alpha-olefin, and 0%–2% by mole of diene.

34. The cable of claim 29, wherein the alpha-olefin is 1-octene.

35. The cable of claim 1, wherein the propylene homopolymer or copolymer (a) has a melting enthalpy greater than 75 J/g.

36. The cable of claim 35, wherein the propylene homopolymer or copolymer (a) has a melting enthalpy greater than 85 J/g.

37. The cable of claim 1, wherein the propylene homopolymner or copolymer (a) is present in an amount such that the flame-retardant coating has a thermocompression resistance value, measured at 100° C. according to CEI standard 20-34/3-1, greater than 50%, and wherein the flame-retardant coating is extruded.

38. The cable of claim 1, wherein the copolymer (b) is present in an amount such that the flame-retardant coating has a value of elongation at break, measured according to CEI standard 20-34 §5.1, of at least 100%, and a value of modulus at 20%, measured according to CEI standard 20-34 §5.1, lower than 12 MPa, and wherein the flame-retardant coating is extruded.

39. The cable of claim 1, wherein the copolymer (b) is present in an amount such that the flame-retardant coating has a value of elongation at break, measured according to CEI standard 20-34 §5.1, of at least 150%, and a value of modulus at 20%, measured according to CEI standard 20-34 §5.1, lower than 7 MPa, and wherein the flame-retardant coating is extruded.

40. The cable of claim 1, wherein the flame-retardant coating comprises from 5% to 60% by weight of the propylene homopolymer or copolymer (a) and from 40% to 95% by weight of the copolymer (b), these percentages being referred to a total weight of polymeric components (a) and (b).

41. The cable of claim 40, wherein the flame-retardant coating comprises from 10% to 40% by weight of the propylene homopolymer or copolymer (a) and from 60% to 90% by weight of the copolymer (b), these percentages being referred to the total weight of the polymeric components (a) and (b).

42. The cable of claim 1, wherein the magnesium hydroxide (c) is present in an amount between 10% and 90% by weight with respect to a total weight of the flame-retardant coating.

43. The cable of claim 42, wherein the magnesium hydroxide (c) is present in an amount between 30% and 80% by weight with respect to the total weight of the flame-retardant coating.

44. The cable of claim 1, wherein the flame-retardant coating further comprises a coupling agent capable of increasing compatibility between the magnesium hydroxide and polymeric components (a) and (b).

45. The cable of claim 44, wherein the coupling agent is one or more saturated silane compounds or silane compounds containing at least one ethylenic unsaturation; epoxides containing an ethylenic unsaturation; monocarboxylic acids having at least one ethylenic unsaturation; dicarboxylic acids having at least one ethylenic unsaturation; anhydrides of the monocarboxylic acids; anhydrides of the dicarboxylic acids; esters of the monocarboxylic acids; or esters of the dicarboxylic acids.

46. The cable of claim 45, wherein the coupling agent is maleic anhydride.

47. The cable of claim 44, wherein the coupling agent has an ethylenic unsaturation and is added to a mixture in combination with a radical initiator, so as to graft the coupling agent directly onto a polymeric matrix.

48. The cable of claim 47, wherein the radical initiator is a peroxide.

49. A flame-retardant composition, comprising:
   (a) a crystalline propylene homopolymer or copolymer;
   (b) a copolymer of ethylene with at least one alpha-olefin having from 3 to 12 carbon atoms, and optionally with a diene, the copolymer (b) being characterized by a composition distribution index greater than 45%, the index being defined as a weight percentage of copolymer molecules having an alpha-olefin content within 50% of an average total molar content of alpha-olefin; and
   (c) natural magnesium hydroxide in amounts such as to impart flame-retardant properties.

50. The flame-retardant composition of claim 49, wherein the magnesium hydroxide has a specific surface between 5 $m^2/g$ and 20 $m^2/g$.

51. The flame-retardant composition of claim 49, wherein in the copolymer (b) the alpha-olefin has a formula $CH_2=CH-R$, where R is a linear or branched alkyl having from 1 to 10 carbon atoms.

52. The flame-retardant composition of claim 49, wherein the propylene homopolymer or copolymer (a) has a melting enthalpy greater than 75 J/g.

53. The flame-retardant composition of claim 49, wherein the magnesium hydroxide is present in an amount between 10% and 90% by weight with respect to a total weight of the flame-retardant composition.

54. The flame-retardant composition of claim 49, further comprising a coupling agent capable of increasing compatibility between the magnesium hydroxide and polymeric components (a) and (b).

55. A method for manufacturing a cable having improved mechanical properties and enhanced fire resistance, comprising the steps of:
   (1) preparing a polymer mixture with flame-retardant properties; and
   (2) extruding the mixture on a conductor optionally pre-coated with an insulating layer, in order to obtain a flame-retardant coating;
   wherein step (1) comprises mixing a predetermined amount of natural magnesium hydroxide with:
   (a) a crystalline propylene homopolymer or copolymer; and
   (b) a copolymer of ethylene with at least one alpha-olefin, and optionally with a diene, the copolymer (b) being characterized by a composition distribution index greater than 45%, the index being defined as a weight percentage of copolymer molecules having an alpha-olefin content within 50% of an average total molar content of alpha-olefin.

56. The method of claim 55, wherein the amount of natural magnesium hydroxide to be added is predetermined such as to obtain a cable which is capable of passing a fire resistance test according to CEI standard 332-1.

57. The method of claim 53, wherein the propylene homopolymer or copolymer (a) is present in an amount such that the flame-retardant coating obtained after extrusion has a value of thermocompression resistance, measured at 100° C. according to CEI standard 20-34/3-1, greater than 50%.

58. The method of claim 55, wherein the copolymer (b) is present in an amount such that the flame-retardant coating obtained after extrusion has a value of elongation at break, measured according to CEI standard 20-34 §5.1, of at least 100%, and a value of modulus at 20%, measured according to CEI standard 20-34 §5.1, lower than 12 MPa.

59. The method of claim 58, wherein the copolymer (b) is present in an amount such that the flame-retardant coating obtained after extrusion has a value of elongation at break, measured according to CEI standard 20-34 §5.1, of at least 150%, and a value of modulus at 20%, measured according to CEI standard 20-34 §5.1, lower than 7 MPa.

60. The flame-retardant composition of claim 49, wherein the copolymer (b) is a copolymer of ethylene with at least one $C_4-C_{12}$ alpha-olefin, and optionally a diene, the copolymer (b) having a density from 0.86 $g/cm^3$ to 0.90 $g/cm^3$.

61. The flame-retardant composition of claim 49, wherein the flame-retardant composition is in a non-crosslinked form.

62. The flame-retardant composition of claim 49, wherein the flame-retardant composition is in a partially-crosslinked form.

63. The cable of claim 1, wherein the flame-retardant coating is in a non-crosslinked form.

64. The cable of claim 1, wherein the flame-retardant coating is in a partially-crosslinked form.

65. The cable of claim 1, wherein the flame-retardant coating is extruded on the conductor.

66. The cable of claim 1, wherein the flame-retardant coating is extruded around the conductor.

67. The cable of claim 1, wherein the flame-retardant coating surrounds the conductor over at least a substantial portion of a length of the conductor.

68. The method of claim 55, wherein the magnesium hydroxide is present in an amount between 10% and 90% by weight with respect to a total weight of the polymer mixture.

* * * * *

UNITED STATES PATENT AND TRADEMARK OFFICE
CERTIFICATE OF CORRECTION

PATENT NO.    : 6,552,112 B1
DATED         : April 22, 2003
INVENTOR(S)   : Eduardo Grizante Redondo et al.

It is certified that error appears in the above-identified patent and that said Letters Patent is hereby corrected as shown below:

Column 18,
Line 44, "homopolymner" should read -- homopolymer --.

Column 19,
Line 59, "copolymer; (b)" should read -- copolymer (b) --.

Column 20,
Line 19, "homopolymner" should read -- homopolymer --.

Column 22,
Line 12, "claim 53," should read -- claim 55, --.

Signed and Sealed this

Twenty-seventh Day of April, 2004

JON W. DUDAS
*Acting Director of the United States Patent and Trademark Office*